United States Patent [19]

Tolocko

[11] Patent Number: 5,251,739
[45] Date of Patent: Oct. 12, 1993

[54] AUTOMATIC FRAMING SYSTEM

[75] Inventor: Gary Tolocko, Milton, Wis.

[73] Assignee: Giddings & Lewis, Inc., Fond du Lac, Wis.

[21] Appl. No.: 955,150

[22] Filed: Oct. 1, 1992

Related U.S. Application Data

[62] Division of Ser. No. 649,487, Feb. 1, 1991, Pat. No. 5,191,958.

[51] Int. Cl.$^5$ .............................................. B65G 37/00
[52] U.S. Cl. ................................... 198/346.2; 29/430
[58] Field of Search ............. 198/346.1, 346.2, 345.1, 198/345.3; 29/430, 829, 830

[56] References Cited

U.S. PATENT DOCUMENTS

| | | |
|---|---|---|
| 4,162,387 | 7/1979 | DeCandia . |
| 4,256,947 | 3/1981 | DeCandia . |
| 4,421,225 | 12/1983 | Hetman, Jr. ...................... 198/346.2 |
| 4,646,915 | 3/1987 | Ohtaki et al. ...................... 198/346.2 |
| 4,667,866 | 5/1987 | Tobita et al. ...................... 29/824 X |
| 4,856,698 | 8/1989 | Marianne et al. .................. 29/430 X |
| 4,860,439 | 8/1989 | Riley ............................. 198/346.2 X |
| 4,924,996 | 5/1990 | Svensson et al. .................. 29/430 X |
| 4,964,497 | 10/1990 | Bundo et al. ...................... 198/346.2 X |

FOREIGN PATENT DOCUMENTS

| | | | |
|---|---|---|---|
| 0110581 | 5/1987 | Japan | 29/430 |
| 0160970 | 7/1987 | Japan | 29/430 |

Primary Examiner—Joseph E. Valenza
Assistant Examiner—Tuan Nguyen
Attorney, Agent, or Firm—Donald Cayan

[57] ABSTRACT

An automatic framing system comprises at least one framing station located along a path. Workpiece carrying pallets are propelled along the path by draw bars. At each framing station, a critical lift lifts the workpiece from the pallet to a work station. The critical lift comprises a first lift mechanism for raising a frame located under the workpiece from a lowered position remote from the workpiece to an intermediate position proximate the workpiece. A second lift mechanism raises the frame from the intermediate position to a third position to contact and lift the workpiece from the pallet to the work station. Side gates pivot between open and closed configurations about respective horizontal axes located near the critical lift. The critical lift frame interlocks with the closed side gates when the frame is in its third position When in the closed configuration, tooling within the side gates clamps the workpiece at the work station. The workpiece is then welded or otherwise processed by suitable equipment at the framing station.

3 Claims, 12 Drawing Sheets

5,251,739

AUTOMATIC FRAMING SYSTEM

This is a divisional of co-pending application Ser. No. 649,487, filed on Feb. 1, 1991, now U.S. Pat. No. 5,191,958.

BACKGROUND OF THE INVENTION

1. Field of the Invention

This invention pertains to automated assembly systems, and more particularly to apparatus for welding individual metal pieces into a completed product.

2. Description of the Prior Art

Modern automotive vehicles include a number of sheet metal workpieces welded into a unitary body. The sheet metal workpieces are usually transported along a continuous path between consecutive work stations. At each work station the workpieces are clamped together in accurate relation to each other by suitable tooling. Then the workpieces are welded by welding robots or the like into a sturdy unitary structure.

Examples of prior equipment for manufacturing motor vehicle subassemblies may be seen in U.S. Pat. Nos. 4,162,387 and 4,256,947. In the prior equipment, sheet metal workpieces comprising a subassembly are supported on and transported between a number of framing stations by pallets. At each framing station, a shot pin device locates the pallet in position at a work station. Side gates on both sides of the work station swing about respective horizontal axes from an inoperative position remote from the workpieces to an operative position proximate the workpieces. When the side gates are in the operative position, tooling on the side gates clamps the workpieces. Then the workpieces are welded together by welding robots. After welding, the side gate tooling unclamps the workpieces, and the side gates swing open to their inoperative position. The shot pin device releases the pallet, and the pallet transports the welded subassembly to the next downstream work station for further processing.

Although the prior automotive body welding system have enjoyed some success, they nevertheless possess a few disadvantages. One disadvantage concerns the stack up of tolerances between the pallets and the tooling on the side gates at the work stations. In the prior systems, the sheet metal workpieces are supported on the pallets, and it is the pallets that are shot pinned to the tooling located at the work station. The tolerances inherent in locating the workpieces on the pallet, in locating the pallet at the work station by the shot pin device, and in locating the various tooling elements on the side gates results in undesirable inaccuracies in the locations of the workpieces relative to the side gate tooling. The fact that prior autobody welding systems can employ 20 to 100 or more different pallets increases the probability of detrimental tolerance build up between the workpieces and the tooling.

Another drawback of prior automotive body welding systems involves the swinging of the side gates between their operative and inoperative positions. In prior equipment, the side gates swing about respective horizontal axes located higher from the factory floor than the pallet and workpieces. Because of the configuration of many automotive vehicle bodies, it is frequently difficult to reach and accurately clamp all the workpieces with the tooling in the side gates. Some systems therefore employ secondary swingable gates, frequently called dump units, that are pivotally connected to the side gates at the ends thereof distal from their pivoting ends. The dump units enable tooling to more easily reach the entire workpieces for accurate clamping. However, the dump units add additional variables to the tooling locations relative to the workpieces. In addition, the dump units add considerable expense and complexity to the framing systems.

Thus, a need exists for improvements in automotive body welding machinery.

SUMMARY OF THE INVENTION

In accordance with the present invention, an automatic framing system is provided that accurately processes individual workpieces into completed assemblies on a production basis. This is accomplished by apparatus that includes a critical lift at each of one or more framing stations that raises one or more workpieces from a pallet to a work station whereat bottom pivoting side gates clamp the workpieces for processing.

The workpieces are loaded onto a pallet at a loading station upstream from the framing stations. The individual workpieces may be initially tabbed together to hold them approximately in their correct relative locations. From the loading station, the pallets are individually propelled in a downstream direction along a path to the framing stations.

The critical lift at each framing station comprises pairs of first and second pedestals anchored to the machine base. The first pedestals are located across from each other on opposite sides of the pallet path. The second pedestals are located on opposite sides of the pallet path and downstream from the first pedestals. Mounted to each pedestal for rotation about a horizontal axis perpendicular to the pallet path is a large gear. A cam follower is attached to a face of each gear.

The four gears in their respective pedestals are rotated simultaneously in the same direction by an electric motor and a rack and pinion drive. The motor drives a drive shaft that extends perpendicular to and under the pallet path. The drive shaft carries a pair of first pinions that mesh with the associated gears mounted in the pair of first pedestals. The drive shaft also carries a second pinion that meshes with a long rack that extends parallel to the pallet path. The rack meshes with a drive pinion on a second shaft rotatably mounted in the second pedestals. The second shaft includes a pair of first pinions that mesh with the gears of the respective second pedestals. In that manner, oscillating the electric motor causes the four gears to oscillate in unison and in the same direction.

Supported by the four cam followers on the corresponding pedestal gears is an elongated frame, which forms a part of the critical lift and which has a generally horizontal platform. A post is upstandingly secured to each of the four corners of the frame platform. Extending horizontally and outwardly from the free end of each frame post is a short arm. The arms are located so as to be generally vertically above respective pedestals. Depending from each arm is a lift cylinder. The piston rod of the lift cylinder is connected to one end of a horizontally oriented bar. The second end of the bar is pivotally connected to the frame arm. A pair of stop blocks on the arm and bar cooperate to locate the bar relative to the frame arm when the lift cylinder is in the retracted position. The bar end under the lift cylinder is supported by the cam follower of the associated pedestal gear. Mounted to the top of each arm generally above the associated lift cylinder is a guide block. Oscillation of the critical lift electric motor causes the frame to raise and lower in generally vertical directions relative to the machine base in correlation with the rotational positions of the pedestal gears and the cam followers attached to them. Activation of the lift cylinders causes the frame to raise and lower additional amounts relative to the cam followers on the pedestal gears. A portion of the weight of the critical lift frame and its components is born by counterbalance cylinders. Preferably, a counterbalance cylinder is located in association with each frame arm and extends from the arm to the machine base.

Secured to the framing station base in association with at least one frame post is a standard. A pair of vertically aligned rollers are installed in the standard. The rollers fit between a pair of guide strips fastened to the associated frame post so as to rather loosely limit horizontal movement of the frame in directions perpendicular to the pallet path when the frame is raised and lowered by the pedestal gears and lift cylinders. A similar standard, rollers, and guide strips are employed to limit frame motion in the directions parallel to the pallet path.

The platform of the critical lift frame is designed to carry workpiece supports that are specific to the particular workpieces to be processed at the framing stations. Generally, the supports comprise a series of fingers or antlers that are shaped and located to enable the workpieces to be lifted from the pallet to the work station.

Further in accordance with the present invention, the side gates that hold the tooling for clamping the workpieces at each work station pivot about respective horizontal axes that are relatively close to the machine base. There is a side gate on each side of the pallet path. Each side gate has a lower end and an upper end. The lower end of each side gate pivotally rests on a horizontal shaft that extends in a direction parallel to the pallet path. The shaft is supported on the machine base approximately in horizontal alignment with the critical lift frame.

The upper end of each side gate is driven and guided for oscillating in a plane perpendicular to the pallet path by a close mechanism. The gate close mechanisms are supported by a sturdy framework anchored to the factory floor and overlying the side gates and critical lift. The side gate close mechanisms operate the side gates between an open configuration whereat the side gates are remote from the workpieces at the work station and a closed configuration whereat the side gates are proximate the workpieces at the work station. Lock means mounted to the machine framework accurately locate and retain the side gates at their closed configuration.

Each side gate is formed with two docking receptacles. A docking receptacle is located above each of the guide blocks mounted to the tops of the arms of the critical lift frame.

It is a feature of the present invention that the pallets are propelled in the downstream direction between the various framing stations in a non-synchronous manner. A preferred propulsion system is a non synchronous draw bar that operates only between two consecutive framing stations. With that type of conveyor system, a malfunction can occur at a particular framing station without affecting operations of the other stations.

In operation, the pedestal gears are rotated such that the cam followers attached to them are at their lowermost positions. The frame and the workpiece supports on the frame platform are thus at lowered positions. The side gate close mechanisms initially operate the side gates to their open configuration. The draw bar propels a pallet downstream to a transfer point at a framing station. The transfer point is located directly over the platform of the critical lift at the framing station. When the pallet is at the transfer point and shot pinned, the side gate close mechanisms swing the side gates to the closed configuration, and the lock mechanisms lock them in place. Simultaneous with the operation of the side gates, the critical lift motor is actuated to rotate the pedestal gears and raise the critical lift frame to an intermediate position such that the platform fingers are in close proximity to the undersides of the workpieces on the pallet.

To raise the critical lift frame and its workpiece supports to contact and lift the workpiece off the pallet, the lift cylinders on the critical lift frame are actuated to their extended positions. Doing so causes the respective bars to pivot at their second ends about the frame arms and raise the frame relative to bar first ends, which are supported on the cam followers of the pedestal gears. As a result, the platform is raised to a third position such that the fingers contact the workpieces and lift them off the pallet to the work station. Simultaneously, the guide blocks on the tops of the frame arms are guided into accurate locations by engaging the appropriate docking receptacles in the side gates. As a consequence, the critical lift frame is accurately and rigidly located and joined to the side gates, and the workpieces are accurately located at the work station. The tooling in the side gates is then operated in known manner to clamp the workpieces rigidly and accurately together. Finally, welding robots or the like are operated to perform the necessary operations on the workpieces. When the processing operations are completed, the side gate tooling unclamps the unitary assembly. The critical lift frame descends in two steps. First, the lift cylinders retract to lower the critical lift frame from its third position and the welded assembly from the work station such that support for the assembly is transferred from the frame fingers back to the pallet. Simultaneously, the critical lift guide blocks withdraw from their respective docking receptacles in the side gates. Then the pedestal gears rotate to lower the critical lift frame to its fully lowered position under the pallet. The side gates are pivoted to the open configuration. The pallet and welded assembly are then ready to be propelled downstream by the non synchronous draw bar for further handling and processing.

Other advantages, benefits, and features of the invention will become apparent to those skilled in the art upon reading the detailed description of the invention.

DETAILED DESCRIPTION OF THE INVENTION

Although the following disclosure is detailed and exact to enable those skilled in the art to practice the invention, the physical embodiments herein disclosed merely exemplify the invention, which may be embodied in other specific structure. The scope of the invention is defined in the claims appended hereto.

Figure 1:
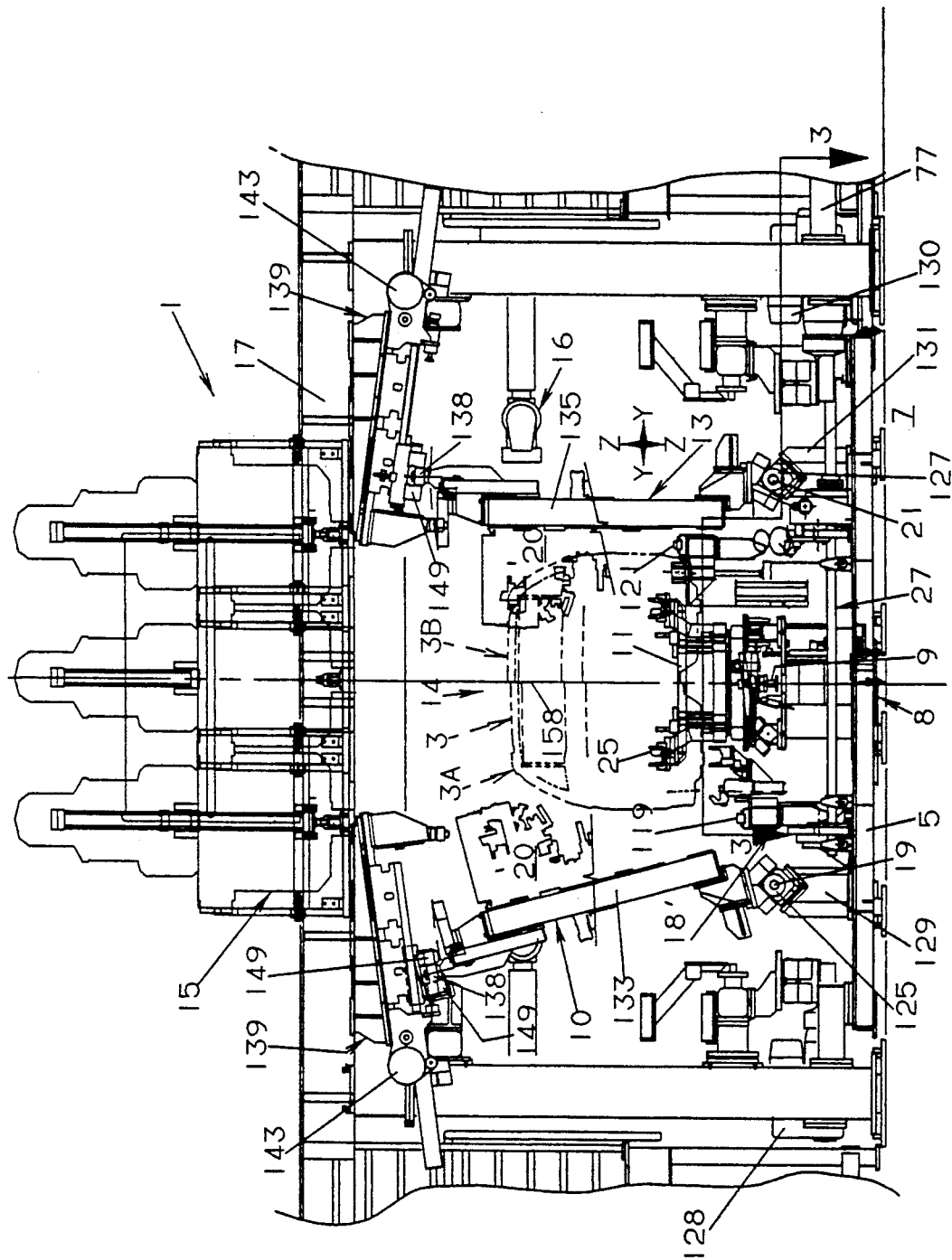
FIG. 1 is an end view of the automatic framing system of the present invention.
Figure 2:
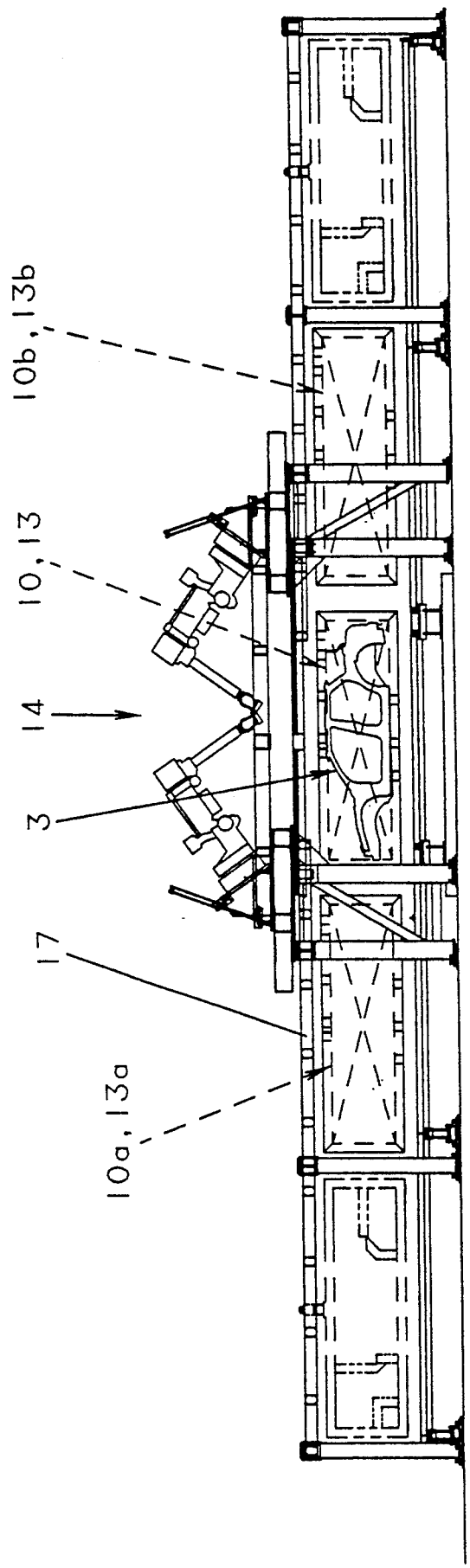
FIG. 2 is a simplified side view of a portion of the automatic framing system adjacent a framing station.

Referring to FIGS. 1 and 2, an automatic framing system 1 is illustrated that includes the present invention. The automatic framing system is particularly useful for transporting and welding preformed sheet metal workpieces into autobodies 3 on a continuous basis. However, it will be understood that the invention is not limited to automotive applications.

General

The automatic framing system 1 is comprised of one or more framing stations 14, at each of which specific manufacturing operations are performed on an autobody 3. Each framing station 14 includes a sturdy base 5 anchored to the factory floor 7. The machine base 5 supports and ties together a critical lift 8 and one or more pairs of opposed side gates 10 and 13. The side gates 10 and 13 shown in FIG. 1 are representative of possible multiple pairs of side gates that contain different tooling 20 for processing different autobodies 3. For example, the automatic framing system may include three pairs of side gates 10, 13; 10a, 13a; and 10b, 13b adjacent the framing station 14, as is shown in FIG. 2. The critical lift 8 and a particular pair of side gates cooperate to form an individual framing station 14. Known welding robots or other processing equipment typically represented at reference numeral 15 are mounted to an overhead framework 17. Additional welding robots or other equipment 16 may be mounted to the base adjacent the side gates for reaching through them to process the autobody 3.

Figure 3:
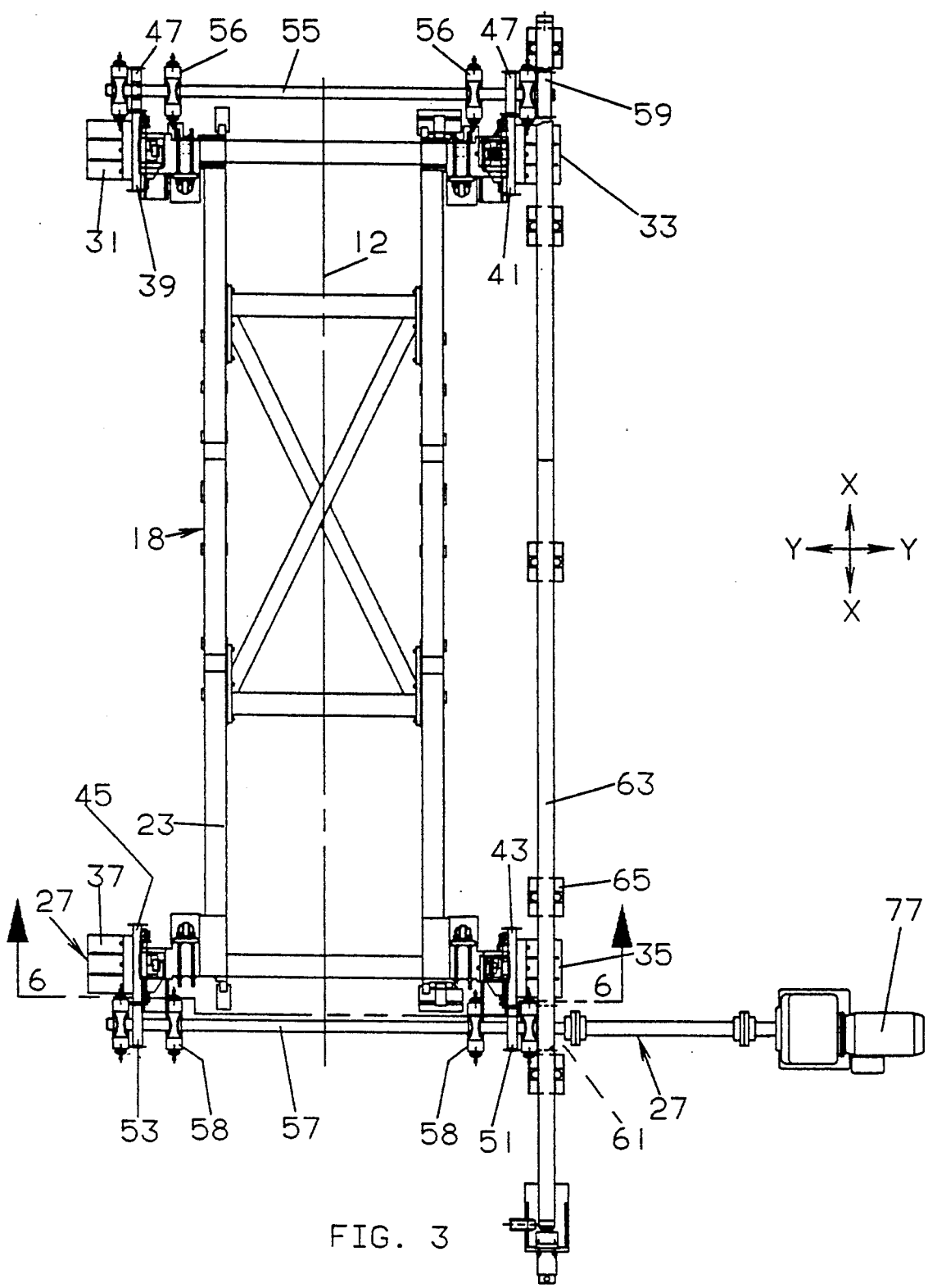
FIG. 3 is an enlarged partial view taken along lines 3—3 of FIG. 1.
Figure 4:
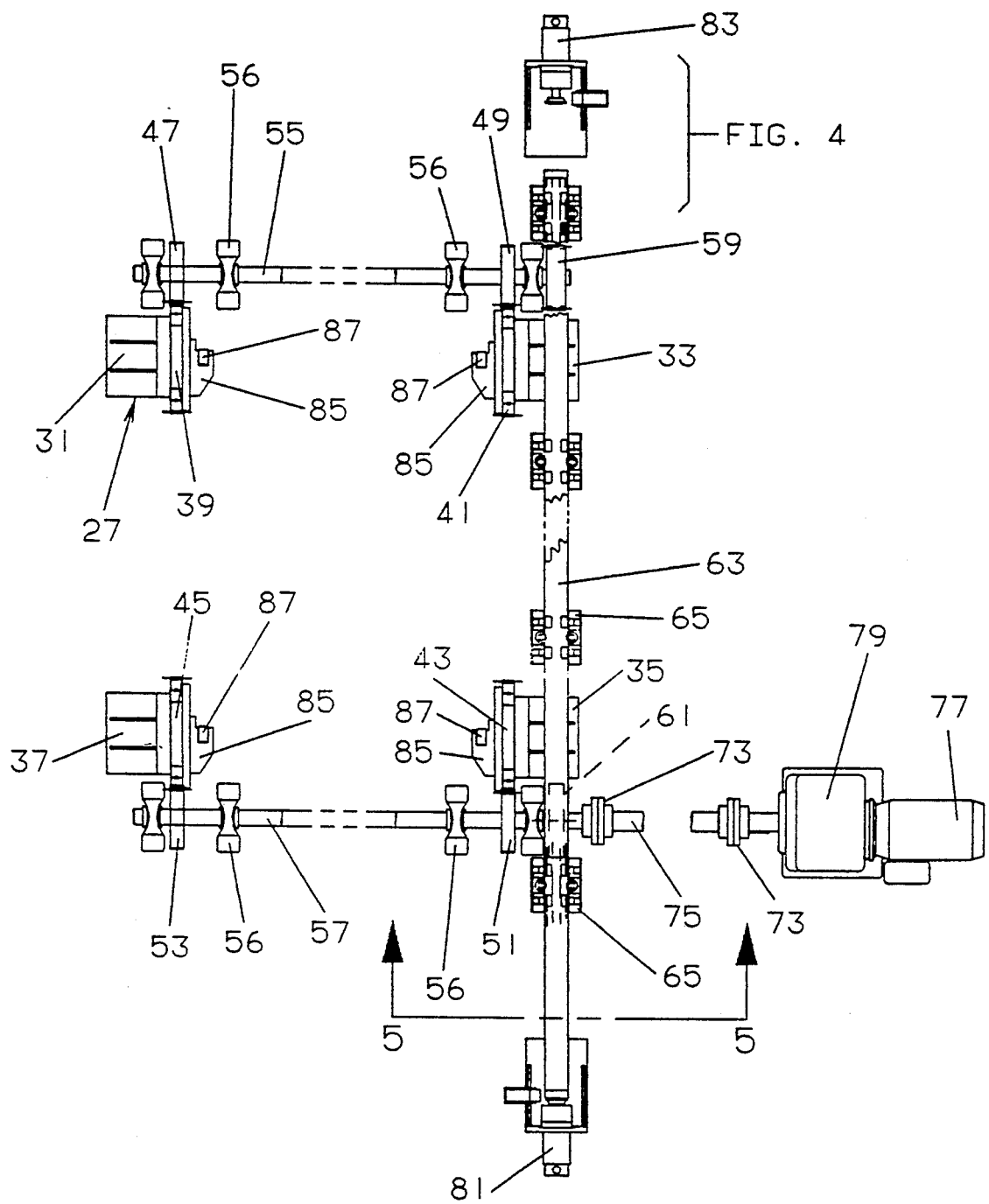
FIG. 4 is a simplified view similar to FIG. 3 showing only the critical lift first lift mechanism.
Figure 5:
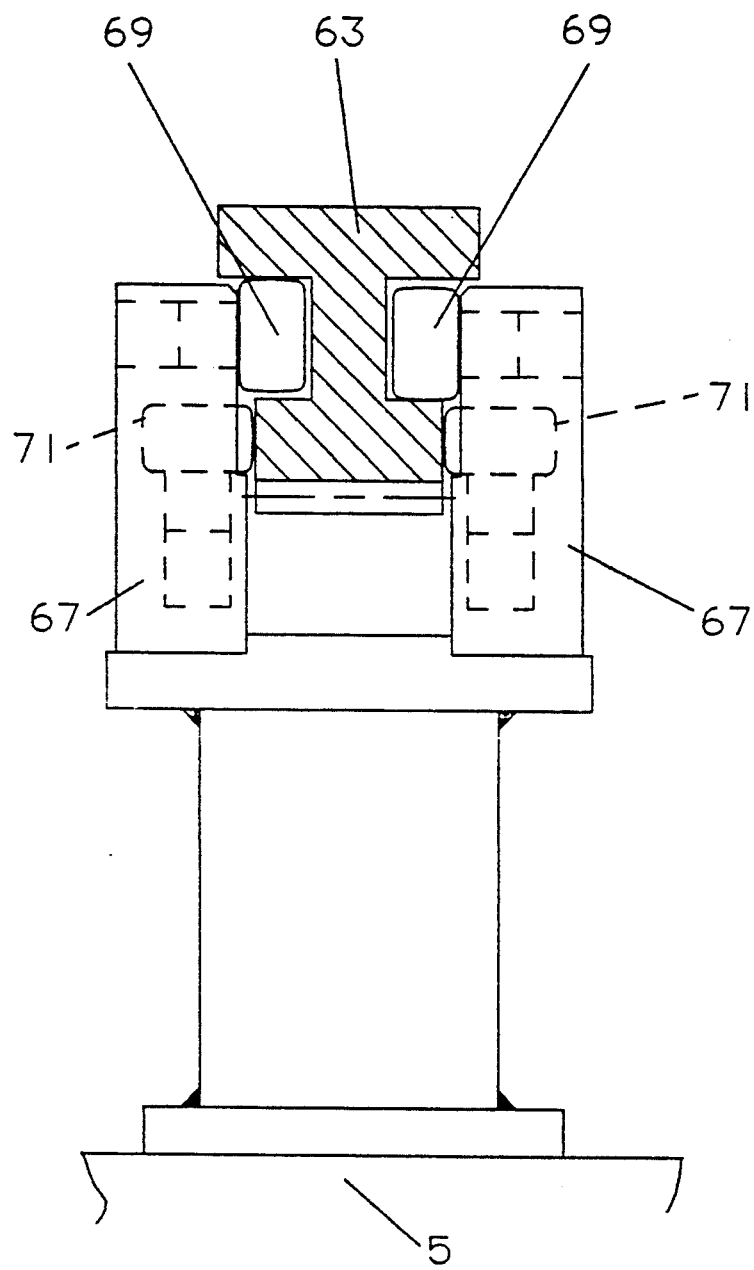
FIG. 5 is a cross sectional view taken along lines 5—5 of FIG. 4.

The autobodies 3 are transported to and from the framing station 14 on respective pallets 11. The pallets 11 are propelled by a non synchronous draw bar 9 along a horizontal path represented by reference numeral 12. Also see FIG. 3. The workpieces that make up an autobody are supported on the pallets by means that suit the particular autobody.

The particular pair of side gates 10, 13; 10a, 13a; or 10b, 13b required for the particular autobody 3 is indexed in the direction of the horizontal path 12 to be at a framing station 14 of the automatic framing system 1. The side gates, such as side gates 10 and 13, are in an open configuration as is indicated by the position of side gate 10 in FIG. 1 as a pallet approaches the framing station. When the pallet 11 has stopped at the framing station, the pallet is over a frame 18 of the critical lift 8. The side gates 10 and 13 then swing about respective axes 19 and 21 to a closed configuration as is indicated by the location of the side gate 13 in FIG. 1. The critical lift operates to lift the workpieces off the pallet to a work station. The tooling 20 on the side gates 10 and 13 clamps the workpieces. The equipment 15 and 16 then welds or otherwise processes the workpieces in the desired manner. After welding, the side gate tooling 20 unclamps the autobody. The critical lift frame 18 lowers the autobody back onto the pallet, the side gates open, and the draw bar 9 propels the pallet downstream along the path 12 for further processing.

For convenience, a coordinate system is chosen such that an X axis extends in the same directions as the pallet path 12. A Y axis extends horizontally and perpendicular to the X axis. A Z axis extends vertically and perpendicular to the X and Y axes.

Critical Lift

As mentioned, the critical lift 8 performs the function of lifting the workpieces of the autobody 3 from the pallet 11 to a work station, where the workpieces are clamped by tooling 20 of the side gates 10 and 13 and then processed by the equipment 15 and 16. For that purpose, the critical lift frame 18 is comprised of a rectangular generally horizontal platform 23. The platform 23 straddles the pallet path 12 in the Y directions and extends therealong in the X directions. Carried on the platform 23 are the fingers or antlers 25. The fingers 25 are designed to lift without distortion the particular autobody workpieces being processed by the automatic framing system 1.

In the preferred embodiment, the critical lift frame 18 is supported on the machine base 5 by a first lift mechanism 27 and a second lift mechanism 29. Also see FIGS. 4-9. The first lift mechanism 27 includes four pedestals 31, 33, 35, and 37 anchored to the base 5, with a pedestal being located near each of the corners of the frame platform 23. Rotatably mounted in each pedestal 31, 33, 35, and 37 is a large gear 39, 41, 43, and 45, respectively. The gears 39, 41, 43, and 45 mesh with respective first pinions 47, 49, 51, and 53. The first pinions 47 and 49 are carried on a first shaft 55. The first shaft 55 is mounted in pillow blocks 56 that are joined to the base 5. The first shaft 55 extends in the Y directions under the pallet path 12. The first pinions 51 and 53 are carried by a second shaft 57 that is mounted in pillow blocks 58. Also carried by each shaft 55 and 57 are respective second pinions 59 and 61.

A long generally H-shaped rack 63 meshes with the second pinions 59 and 61. The rack 63 is supported by and guided within several housings 65 that are fastened to the machine base 5. Each housing 65 has a pair of opposed plates 67, to which are installed two cam followers 69 and two cam followers 71. The cam followers 69 are arranged so as to prevent motion of the rack in the Z directions, and the cam followers 71 are arranged to prevent motion of the rack in the Y directions. The housings do not inhibit translation of the rack in the X directions.

To translate the rack 63 in the X directions, one end of the second shaft 57 is connected by couplings 73 and an intermediate shaft 75 to an electric motor 77 and gear reducer 79. By energizing the electric motor 77 to rotate the second pinion 61 of the second shaft 57, the rack translates and thus rotates the first shaft 55. As a result, the gears 39, 41, 43, and 45 rotate in unison and in the same direction. The motor 77 is controlled to oscillate the pedestal gears through angles of approximately 180 degrees. That control is achieved by limit switches 81 and 83 secured to the base 5 at opposite ends of the rack. Upon striking a limit switch 81 or 83, the motor is deenergized and thereby stops rotation of the gears.

Attached to one face of each gear 39, 41, 43, and 45 is a generally trapezoidal block 85. A cam follower 87 is installed in each block 85. The limit switches 81 and 83 control the electric motor 77 to oscillate the gears between respective first angular positions whereat the cam followers 87 are at lowermost positions relative to the respective pedestals 31, 33, 35, and 37 and second angular positions whereat the cam followers are at uppermost positions vertically above their lowermost positions. In one application of the automatic framing system 1, the distance between the lowermost and uppermost positions of the cam followers is approximately 14 inches.

Figure 6:
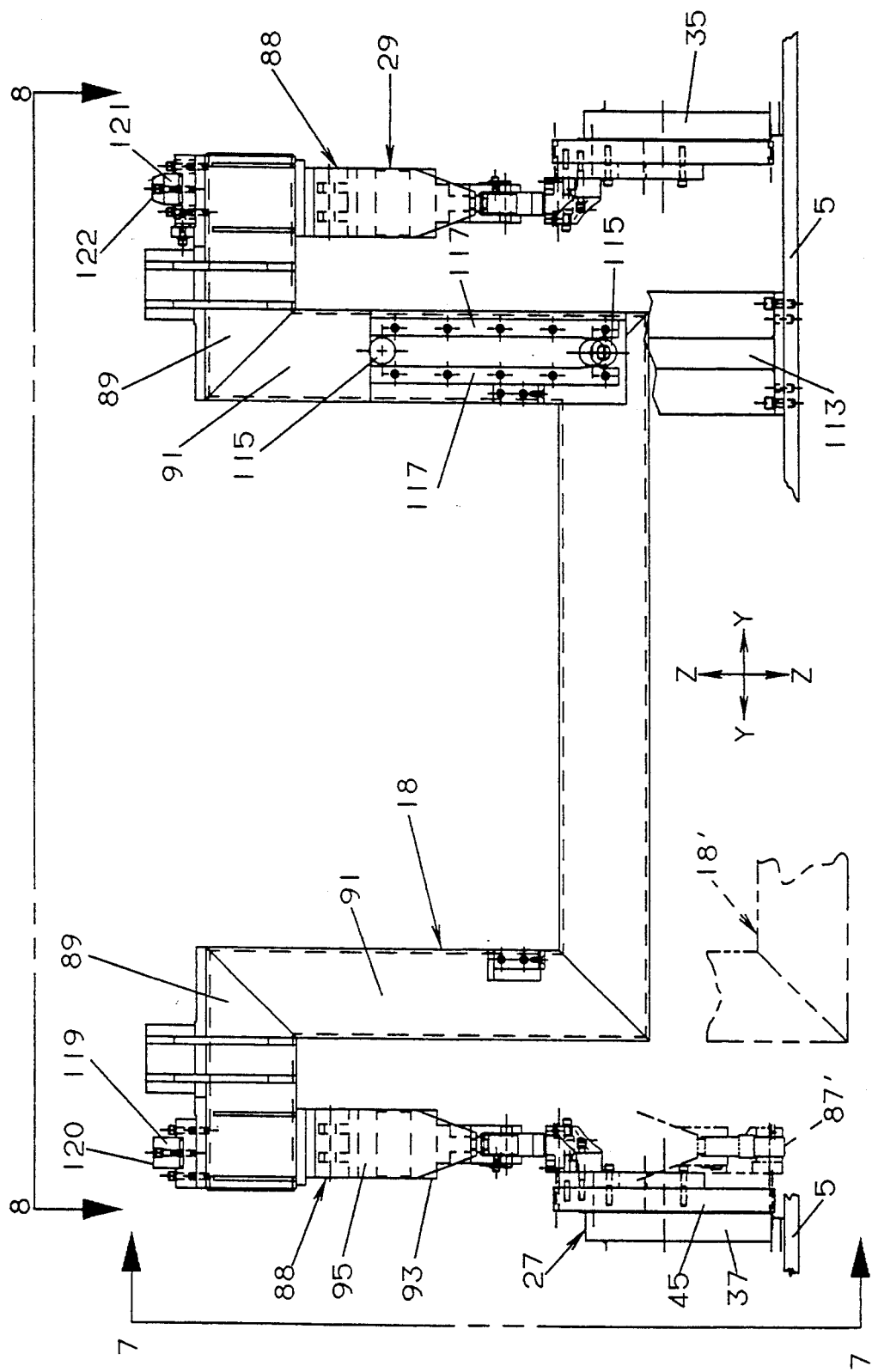
FIG. 6 is an enlarged partial view taken along lines 6—6 of FIG. 3.
Figure 7:
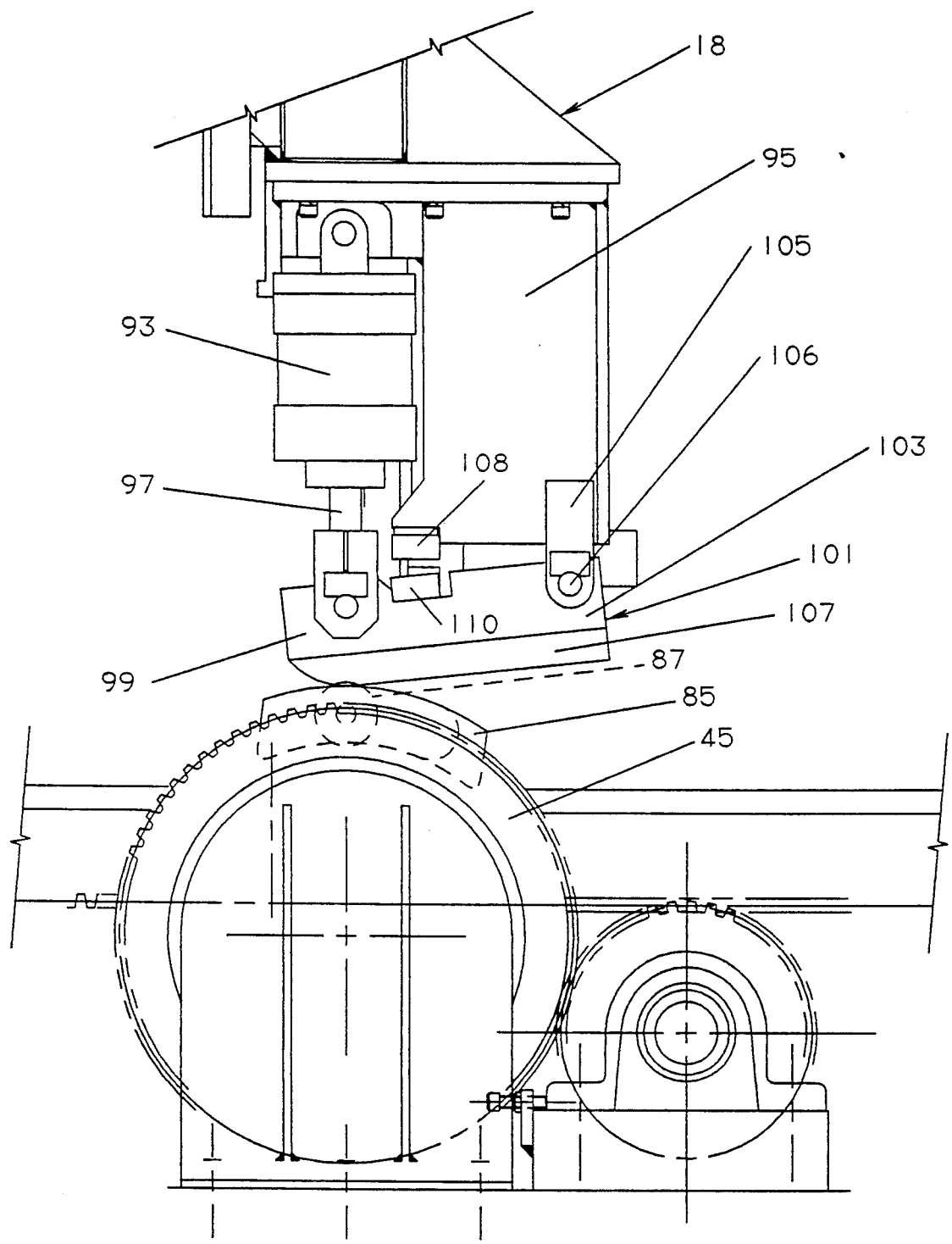
FIG. 7 is an enlarged partial view taken along lines 7—7 of FIG. 6.
Figure 8:
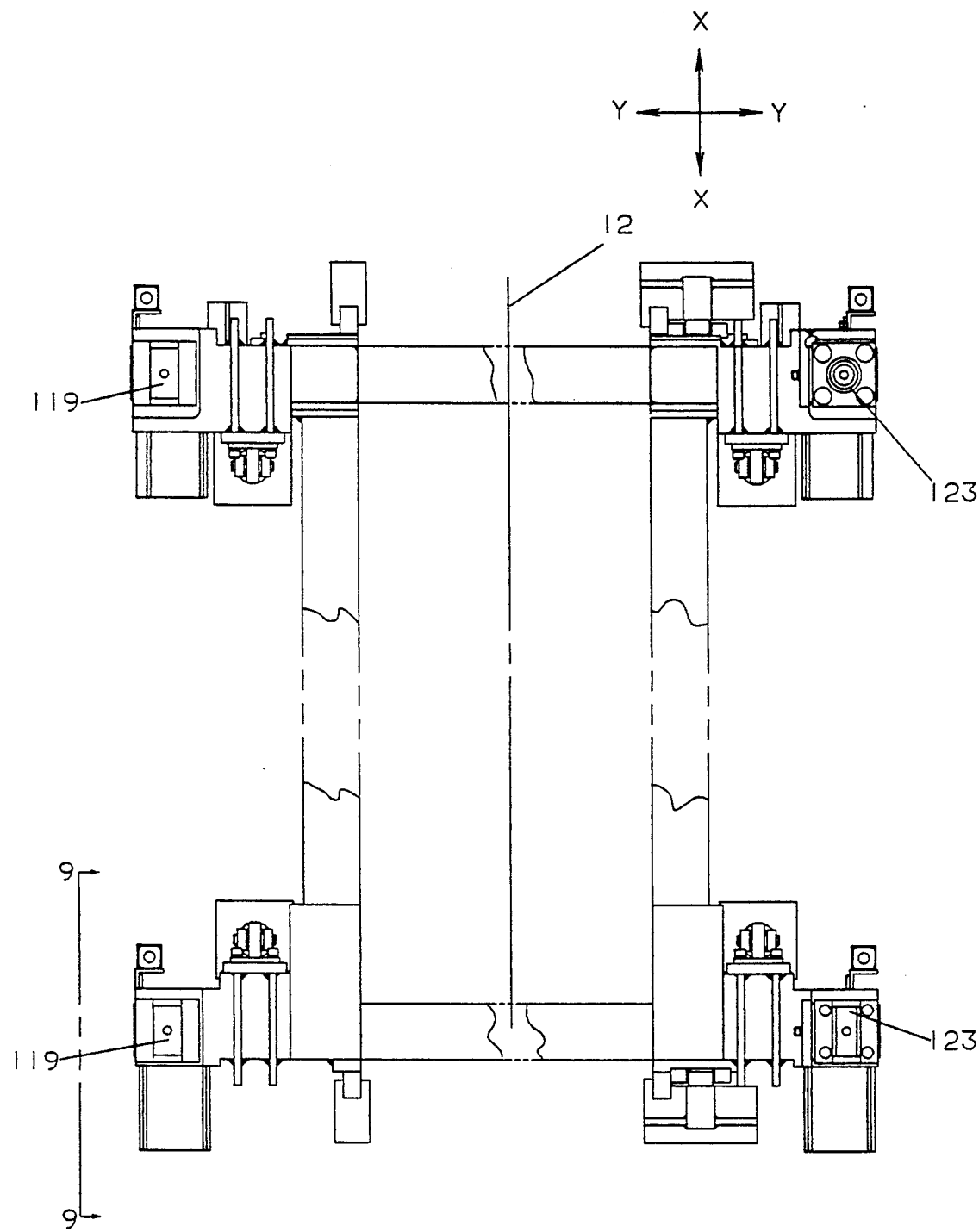
FIG. 8 is a simplified view taken along lines 8—8 of FIG. 6.

With special attention to FIGS. 6 and 7, the second lift mechanism 29 is made up of four generally identical lift mechanisms 88. Each lift mechanism 88 is mounted to the critical lift frame 18 by means of an associated short horizontal arm 89. In turn, the arms 89 are joined to the frame platform 23 through respective upstanding posts 91 secured to the four corners of the platform.

Each lift mechanism 88 of the second lift mechanism 29 is comprised of a lift cylinder 93 pivotally connected at one end to a bracket 95 fastened to the underside of the associated frame arm 89. The piston rod 97 of the lift cylinder 93 is pivotally connected to one end 99 of a bar 101. The second end 103 of the bar 101 is pivotally connected to the bracket 95, as by a clevis 105 and pin 106. Joined to the bar 101 by conventional fasteners (not shown) is a hardened strip 107. The hardened strip 107 rides on the cam follower 87 of an associated pedestal gear 39, 41, 43, or 45. In that manner, the critical lift frame 18 is supported on the machine base 5 by the first lift mechanism 27 and by the second lift mechanism 29.

Figure 9:
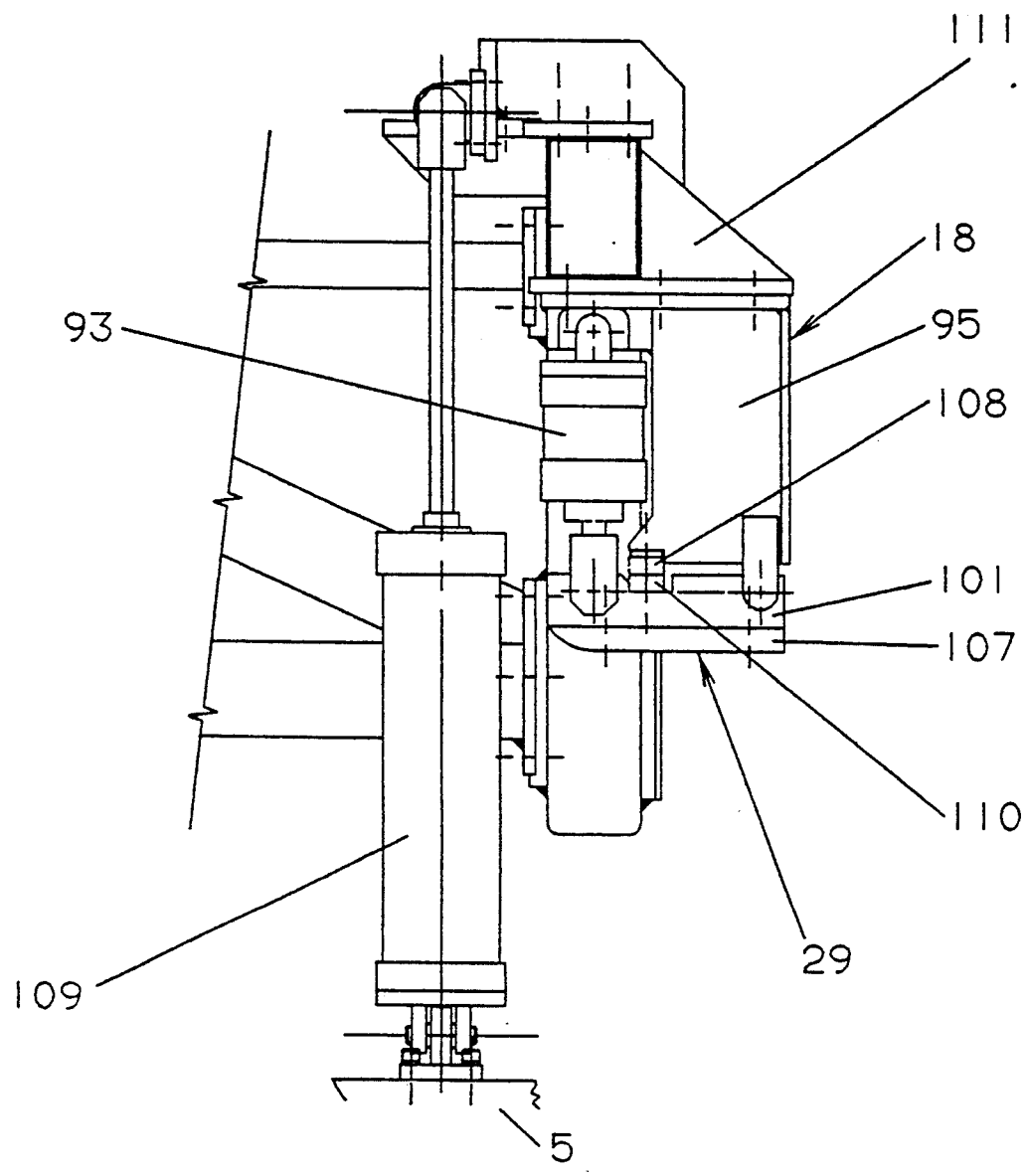
FIG. 9 is an enlarged partial view taken along lines 9—9 of FIG. 8 and rotated 90 degrees counterclockwise showing the counterbalance cylinder in the extended position and the lift cylinder in the retracted position.

A stop block 108 attached to the bracket 95 and a similar stop block 110 attached to the bar 101 abut when the lift cylinder 93 is in the retracted position, FIG. 9. Accordingly, the stop blocks 108 and 110 control the location of the critical lift frame 18 relative to the bar 101, hardened strip 107, and cam follower 87 (not shown in FIG. 9) of the associated pedestal gear 39, 41, 43, or 45 when the lift cylinder 93 is in the retracted position. In FIG. 7, the lift cylinder 93 is shown in the extended position. In that position, the blocks 108 and 110 are separated, and the critical lift frame is raised relative to the cam followers on the pedestal gears. A preferred stroke of the lift cylinder 93 is approximately one inch.

To bear some of the weight of the critical lift frame 18 and the various components carried by it, there is a counterbalance cylinder 109 installed between the machine base 5 and a suitable bracket 111 attached to each arm 89 of the frame. Preferably, about 75 percent of the total weight of the critical lift frame and its components is borne by the counterbalance cylinders 109.

To prevent unwanted motion of the critical lift frame 18 in the Y directions, the critical lift 8 further comprises one or more standards 113 secured to the machine base 5 (FIG. 6). A pair of vertically aligned rollers 115 are installed on the standard 113. A pair of guide strips 117 are fastened to a post 91 of the frame 18 and are spaced apart to loosely capture the rollers 115 between them. Consequently, the critical lift frame is capable of only small controlled motions in the Y directions. Although not shown in the drawings, similar standards, rollers, and guide strips are employed to loosely control critical lift frame movement in the X directions.

Mounted to the upper side of each frame arm 89 is a guide block. It is preferred that two of the guide blocks are in the form of short pads 119 having flat end surfaces 120. The end surfaces 120 of the pads 119 are accurately located relative to the fingers 25 on the frame platform 23. A third guide block is in the form of a rectangular block 121 having tapered corners 122 that extend parallel to the X axis. The locations of the tapered corners 122 are also accurately located relative to the platform fingers 25. To the upper side of the fourth frame arm is mounted a fourth guide block 123 in the form of a cylinder having a frusto conical end surface. The frusto conical end surface is accurately located relative to the platform fingers.

Side Gates

Further in accordance with the present invention, the side gates 10 and 13 pivot in the Y directions about respective axes 19 and 21 that are located relatively close to the machine base 5. As best shown in FIG. 1, the axes 19 and 21 are defined by respective horizontal shafts 125 and 127 mounted in supports 129 and 131.

Each side gate 10 and 13 has a beam 133 and 135, respectively, to which is assembled the tooling 20 suitable for the particular autobody 3 being processed at the framing station 14. At the upper end of each side gate beam 133, 135 is a large diameter cam follower 138. The lower end of each side gate beam 133, 135 is supported on the associated shaft 125, 127 for pivoting thereabout in the Y directions and for sliding therealong in the X directions. Power units generally indicated at reference numerals 128 and 130 are employed to index the side gates 10 and 13, respectively, along their shafts in the X directions. In that manner, different side gates, each supporting different tooling 20 for different autobodies, are supported on the shafts 125 and 127 for sliding therealong to be aligned with the critical lift 8.

To pivot the side gates 10 and 13 about their respective shafts 125 and 127, the automatic framing system 1 further includes a close mechanism 139 in association with each side gate. In the construction illustrated in FIGS. 1 and 10, each close mechanism 139 comprises a sturdy housing 141 joined to the framework 17 above the framing station 14. The close mechanisms 139 are located at approximately the X axis midpoints of the particular side gate beams 133 and 135 a the framing station 14. Within each housing 141 is mounted an electric motor 143 that drives a pinion 145. Guided in the housing and meshing with the pinion 145 is a rack 147. A plate 151 is attached to the rack 147, and the plate 151 is designed to slide along one or more guides 153 that form a part of the housing 141. A pair of hardened rollers 149 are attached to the plate 151. The rollers 149 are spaced and located to capture a side gate cam follower 138 between them. The side gate cam follower 138 is mounted to the associated side gate beam 133, 135 by a suitable bracket 140.

The motors 143 of the close mechanisms 139 are energized to oscillate an amount required to reciprocate the associated racks 147 and hardened rollers 149 between advanced locations and withdrawn locations. When the racks and rollers are in their advanced locations, the side gates 10 and 13 are in the closed configuration of the side gate 13 in FIG. 1. When the racks and rollers are in their withdrawn locations, as indicated by roller phantom lines 149' in FIG. 10, the side gates are in the open configuration of side gate 10 in FIG. 1.

Figure 10:
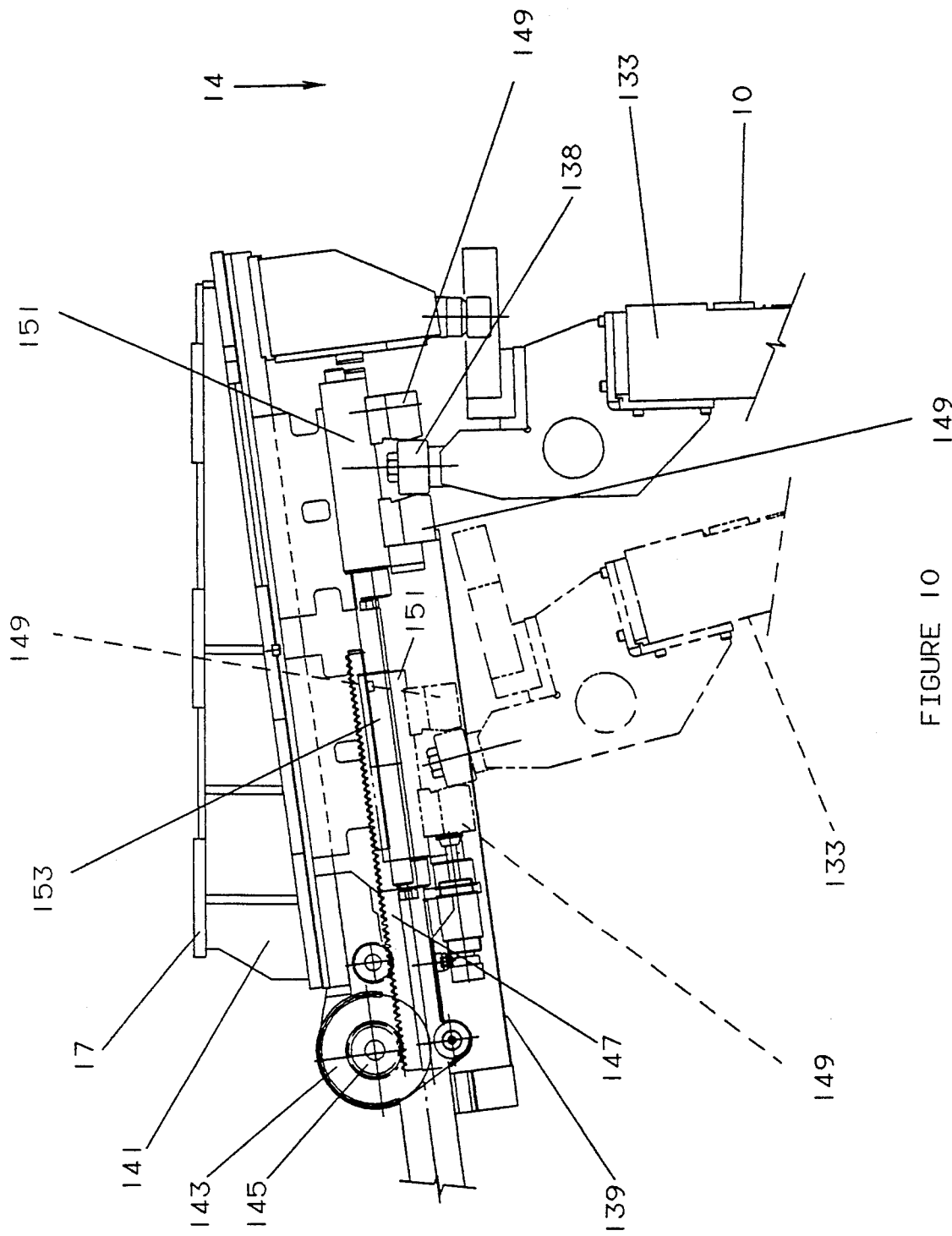
FIG. 10 is an end view of a close mechanism for a side gate.

To accurately locate the side gates 10 and 13 in the X-directions when they are in their closed configuration, each close mechanism 139 is equipped with a pair of cam followers 154, only one of which is shown in FIG. 10. The cam followers 154 are stationarily mounted to the housing 141 by a sturdy lug 152. The cam followers 154 are accurately spaced apart to preceive a guide shoe 160 between them. The guide shoe 160 is joined to the side gate beam 133 by the bracket 140, and it has tapered inboard edges 162. Consequently, the side gates are guided to their proper X-direction locations along their supports 125 and 127 by the cooperation of the cam followers 154 and shoes 160 as the side gates approach their closed configuration.

Figure 11:
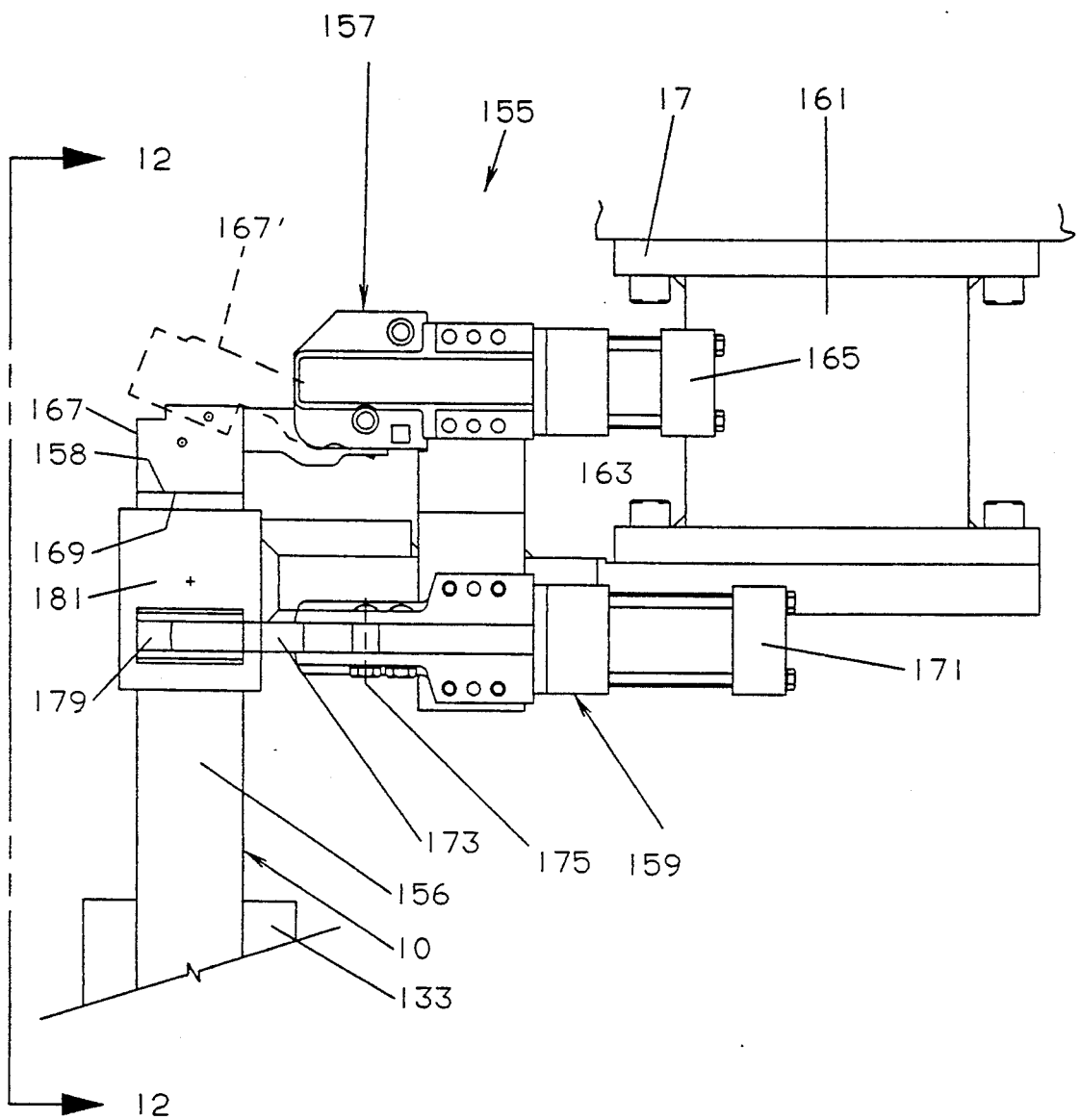
FIG. 11 is a side view of a lock mechanism used with the side gates.
Figure 12:
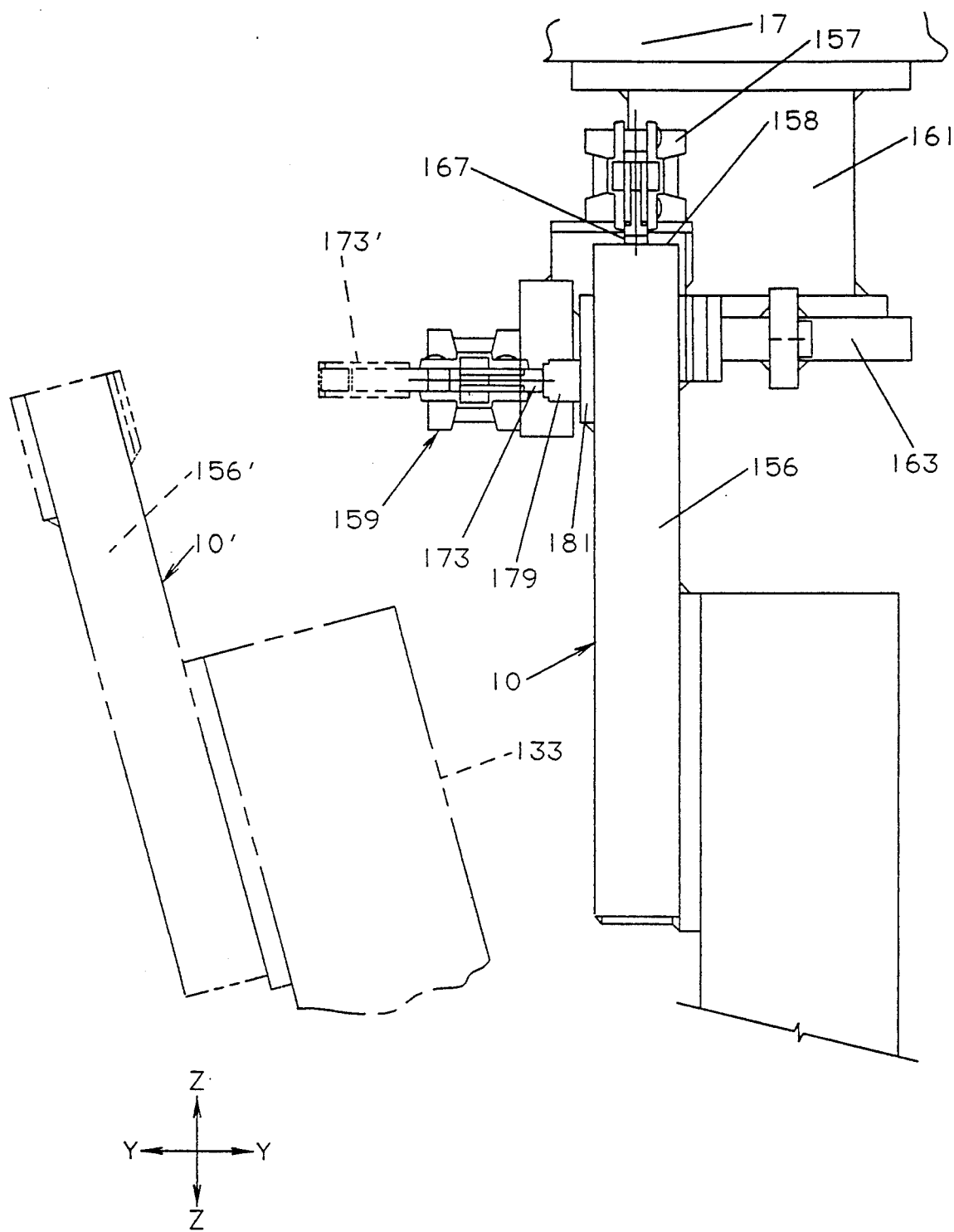
FIG. 12 is a view taken along lines 12—12 of FIG. 11.

To lock the side gates 10 and 13 in their closed configuration, the automatic framing system 1 of the present invention further comprises two sets of lock mechanisms 155 in association with each side gate 10 and 13, FIG. 11 and 12. The two lock mechanisms 155 associated with each side gate are mounted to the framing station framework 17 above the X axis ends of the side gate beams 133 and 135. The lock mechanisms are substantially identical, and the lock mechanism shown in FIGS. 11 and 12 as operating in conjunction with one end of the side gate 10 is representative.

Joined to and extending above the side gate beams 133, 135 in association with each lock mechanism 155 is a bar 156. Each bar 156 has an end surface 158.

Each lock mechanism 155 is comprised of a first lock device 157 and a second lock device 159. Both lock devices 157 and 159 are mounted by means of sturdy brackets 161 and 163 to the framework 17. The first lock device 157 is actuated by a first air cylinder 165. Operation of the air cylinder 165 causes a lever 167 to pivot about a horizontal axis parallel to the Y axis between an unlocked mode as indicated by the phantom lines 167' of FIG. 11 and a locked mode indicated by the solid lines 167. The lock device 157 may be a conventional mechanism with an over-center toggle action to thereby assure that the lever 167 stays in place when it is in the locked mode. The first lock device lever 167 has a face 169. When the first lock mechanism is actuated to its locked mode, the lever face 169 presses against the bar end surface 158 and forces the bar 156 and the entire side gate 10 downwardly against the support 129 (FIG. 1). As a consequence, the tooling 20 in the side gate is rigidly held in place in the Z-axis directions against any inadvertent motion due to vibrations or other reasons resulting from the operation of the framing station 14.

Each second lock device 159 has an air cylinder 171 and a lever 173 that pivots about a vertical axis 175 parallel to the Z axis. When the side gate, such as side gate 10, is in the closed configuration, the second lock device is actuated to a locked mode wherein the lever 173 is as shown in FIG. 11 and in solid lines in FIG. 12. When the second lock device is in the locked mode, a face 177 of the lever 173 presses against a pad 179 that is attached to a plate 180 of the side gate bar 156. In that situation, the second lock device firmly restrains the side gate 10 in its closed configuration. During pivoting of the side gates 10 and 13 toward and away from their respective open configurations, as represented by phantom line 10' in FIG. 12, the second lock devices of the four lock mechanisms 155 are operated to swing their respective levers approximately 90 degrees about their axes 175. In that situation, the levers are in the representative position shown in phantom lines 173 in FIG. 12, and the levers are out of the way of the pivoting side gate arms 156. Although not shown in the drawings, the lock mechanisms 155 also include known shock absorbers and decelerators mounted to the respective brackets 161. The shock absorbers and decelerators cushion the side gates as they approach their closed configuration.

An important aspect of the present invention is that the side gates 10 and 13 cooperate with the critical lift 8 to form a solid mass of tooling for clamping the autobody 3 while it is processed at a framing station 14. For that purpose, the side gates include docking receptacles that engage the associated guide blocks 119, 121, and 123 (FIGS. 6 and 8) on the critical lift frame 18 when the frame lifts the autobody 3 to the work station. Specifically, the side gate 10 is manufactured with two receptacles that abut and locate the end surfaces 120 of the pads 119 when the critical lift first and second lift mechanisms 27 and 29, respectively, operate to lift the autobody 3 off the pallet 11 and to the work station. Similarly, the side gate 13 has docking receptacles that engage the guide blocks 121 and 123. When the critical lift guide blocks are engaged with their associated docking receptacles, all four guide blocks locate the critical lift frame in the Z directions relative to the side gates. Guide block 121 also locates the critical lift frame in the Y directions. Guide block 123 locates the critical lift frame in both the X and Y directions in addition to the Z direction. In that manner, the critical lift frame is accurately and positively located relative to the side gates, and the tooling 20 can accurately and efficiently clamp the autobody at the work station for processing by the equipment 15 and 16.

Operation

Processing an autobody 3 begins by loading the component sheet metal workpieces on a pallet 11 at a loading station, not illustrated. The individual workpieces may be toy-tabbed together to maintain approximately their proper orientations until they are welded together. The pallet is propelled from the loading station by the conveyor 9 in a downstream direction along the path 12 to the framing station 14. The required side gates 10, 13; 10a, 13a; or 10b, 13b are indexed along the shafts 125, 127 by the power units 128, 130 to the framing station 14.

As the pallet 11 and autobody 3 supported thereon approach the framing station 14, the side gates, such as side gates 10 and 13, are in the open configuration of side gate 10 of FIG. 1. The open configuration of the side gates is obtained by operating the respective side gate close mechanisms 139 to slide the guide blocks 149 to their withdrawn locations. During operation of the close mechanisms 139, the lock mechanisms 155, FIGS. 11 and 12, are in their respective unlocked modes; that is, the levers of the lock devices 157 and 159 are in the positions shown at phantom lines 167' and 173', respectively. At the same time, the critical lift frame 18 is in its lowered position, as is indicated by the phantom lines 18' of FIG. 6 and by the position of the frame shown at reference numeral 18' on the left side of the central vertical plane 158 of FIG. 1. The lowered position of the critical lift frame is attained by operating the first lift mechanism 27 to place the cam followers 87 on the gears 39, 41, 43, and 45 in their lowermost positions, as is indicated by the cam follower shown in phantom line 87' in FIG. 6, and by retracting the lift cylinders 93 of the second lift mechanism 29, FIG. 9.

The conveyor 9 stops the pallet 11 at the framing station 14 directly above the critical lift frame 18. The autobody is then at a transfer point as shown by the phantom lines 3A on the left side of the central plane 159 of FIG. 1. The side gate close mechanisms 139 are operated to slide the hardened rollers 149 to their respective advanced locations. As a result, the side gates 10 and 13 pivot about their respective axes 19 and 21 to the closed configuration. When the side gates have reached the closed configuration, the lock devices 157 and 159 of the lock mechanisms 155 are actuated to their respective locked modes to lock the side gates firmly in place.

The electric motor 77 of the critical lift first lift mechanism 27 energizes simultaneously with the operation of the side gate close mechanisms 139 to rotate the gears 39, 41, 43, and 45 by 180 degrees. Doing so causes the cam followers 87 on each gear to move upwardly. As a result, the critical lift frame 18 is raised the same amount. That movement of the critical lift frame causes the fingers 25 thereon to be at an intermediate position in close proximity to the underside of the autobody 3 on the pallet 11.

The four lift cylinders 93 of the critical lift second lift mechanism 29 are actuated to their respective extended positions, FIG. 7. The hardened strips 107 at the first ends 99 of the bars 101 remain in support contact with the associated cam followers 87 of the gears 39, 41, 43, and 45. Accordingly, extending the lift cylinders 93 causes the bars 101 to pivot about their respective pins 106 with respect to the critical lift frame 18. The stop blocks 108 and 110 thus separate. In that manner, the critical lift frame 18 is raised with respect to the first lift mechanism cam followers 87 to a third position.

The amount of the lift produced by the second lift mechanism 29 is controlled by the engagement of the guide blocks 119, 121, and 123 (FIG. 8) on the critical lift frame 18 with the corresponding docking receptacles in the side gates 10 and 13. The loose control of the frame 18 provided by the standards 113, rollers 115, and guide strips 117 enables the four guide blocks to engage and locate the frame within the associated docking receptacles without hindrance. A lift of approximately .75 inches by the second lift mechanism 29 before the guide block engage the side gate docking receptacles is satisfactory. However, depending upon the design of the side gate tooling 20, greater or lesser amounts of lift may also be used. The amount of lift is always sufficient for the critical lift fingers 25 to contact the autobody 3, transfer support of the autobody from the pallet 11 to the critical lift fingers, and lift the autobody to the work station. The autobody at the work station is shown by phantom lines 3B in FIG. 1. At that point, the autobody is accurately located at the work station, and the critical lift frame is positively restrained with respect to the side gates in the X, Y, and Z directions. The tooling 20 on the side gates 10 and 13 rigidly clamps the autobody at the work station. The welding robots 15 and 16 or other equipment are then actuated to weld or otherwise process the autobody.

After welding or other processing, the tooling 20 on the side gates 10 and 13 unclamps the autobody 3. The critical lift second lift mechanism 29 is operated to retract the lift cylinders 93 until the stop blocks 108 and 110 abut, thereby lowering the critical lift frame 18 from its third position to its intermediate position and simultaneously lowering the autobody supported on the critical lift frame fingers 25 from the work station to the transfer point location 3A of FIG. 1. The autobody is thus returned to the pallet 11. At the same time, the critical lift guide blocks 119, 121, and 123 disengage from their respective docking receptacles in the side gates. The critical lift first lift mechanism 27 is then operated to rotate the gears 39, 41, 43, and 44 180 degrees to lower the critical lift frame from its intermediate position to its lowered position 18' in FIGS. 1 and 6. The lock mechanisms 155 actuate to their respective unlocked modes, and the side gate close mechanisms 139 open the side gates. Then the draw bar 9 operates to propel the pallet and autobody downstream from the framing station 14. The multiple pairs of side gates 10, 13; 10a, 13a; and 10b, 13b enable a particular pair to be taken out of service temporarily for maintenance without affecting the operation of the other side gates.

Thus, it is apparent that there has been provided, in accordance with the invention, an automatic framing system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for lifting a workpiece from a transfer point to a work station comprising:

a. a base;

b. a frame generally underlying the workpiece at the transfer point, the frame having a plurality of generally horizontal arms extending therefrom and including finger means for contacting the workpiece at the transfer point;

c. a bar in association with each frame arm, each bar having a first end pivotally connected to the frame arm and a second end;

d. actuator means connected between each frame arm and the second end of the associated bar for pivoting the bar with respect to the frame arm;

e. cam follower means in associated with each bar for supporting the second ends of the associated bars; and f. drive means supported on the base for raising and lowering the cam follower means relative to the base to thereby raise and lower the bars and frame supported thereon, the drive means operating the cam follower means to raise the frame from a lowered position whereat the finger means is remote from the workpiece at the transfer point to an intermediate position whereat the finger means is proximate the workpiece at the transfer point, and the actuator means pivoting the bars to raise the frame relative to the cam follower means to a third position whereat the frame finger means contacts and lifts the workpiece from the transfer point to the work station.

2. The apparatus of claim 1 wherein the cam follower means comprises:

a. a pedestal generally underlying each respective arm of the frame;

b. a gear rotatably mounted in each respective pedestal; and c. a cam follower attached to each gear, each cam follower supporting the second end of an associated bar pivoted to the frame.

3. The apparatus of claim 1 wherein:
a. the frame has first and second ends with at least one arm extending from each end;
b. the cam follower means comprises:
  i. first and second pedestals generally underlying the respective frame arms at each of the frame ends;
  ii. a gear rotatably mounted in each pedestal; and
  iii. a cam follower attached to each pedestal gear, the cam follower supporting the second end of the associated bar on the frame arm; and
c. the drive means comprises:
  i. first and second pinions meshing with the respective gears of the first and second pedestals; and
  ii. rack means for driving the first and second pinions in unison and in the same direction to rotate the gears and thereby raise and lower the frame.

* * * * *